United States Patent [19]

Galloway

[11] Patent Number: 4,874,587
[45] Date of Patent: Oct. 17, 1989

[54] HAZARDOUS WASTE REACTOR SYSTEM

[75] Inventor: Terry R. Galloway, Berkeley, Calif.

[73] Assignee: Thermolytic Decomposer, Richmond, Calif.

[21] Appl. No.: 89,573

[22] Filed: Aug. 26, 1987

Related U.S. Application Data

[63] Continuation-in-part of Ser. No. 903,235, Sep. 3, 1986, abandoned.

[51] Int. Cl.⁴ ............................................. B01J 10/00
[52] U.S. Cl. .................................... 422/189; 422/190; 422/199; 422/172
[58] Field of Search ............... 422/189, 190, 199, 148, 422/172; 431/226, 208.5; 110/237, 250, 236; 208/49, 74

[56] References Cited

U.S. PATENT DOCUMENTS 4,646,660  3/1987  Björkman et al. .................. 110/250
4,688,495  8/1987  Galloway ............................ 110/237

Primary Examiner—Barry S. Richman
Assistant Examiner—Lyle Alfandary-Alexander
Attorney, Agent, or Firm—Fitch, Even, Tabin & Flannery

[57] ABSTRACT

A method and reactor system are described for decomposing organic compounds. A gaseous mixture of organic compounds and water, equal to or in excess of stoichiometry, is passed into a first reaction zone having a temperature range between about 200° C. and 1400° C. The first reaction zone has a labyrinthine path which presents organically adsorbent surfaces to the gaseous mixture to provide a residence time in the first reaction zone sufficient to react substantially all of the gaseous organic compounds and the water at high rate. The effluent from the first reaction zone, still with water equal to or in excess of stoichiometry, is then passed to a second reaction zone having a temperature range between about 750° C. and 1820° C. to decompose the organic compounds remaining in the effluent. The first reaction zone is an annulus which is coaxial with and surrounds the second reaction zone. The labyrinthine path is formed by particulate ceramic material.

11 Claims, 3 Drawing Sheets

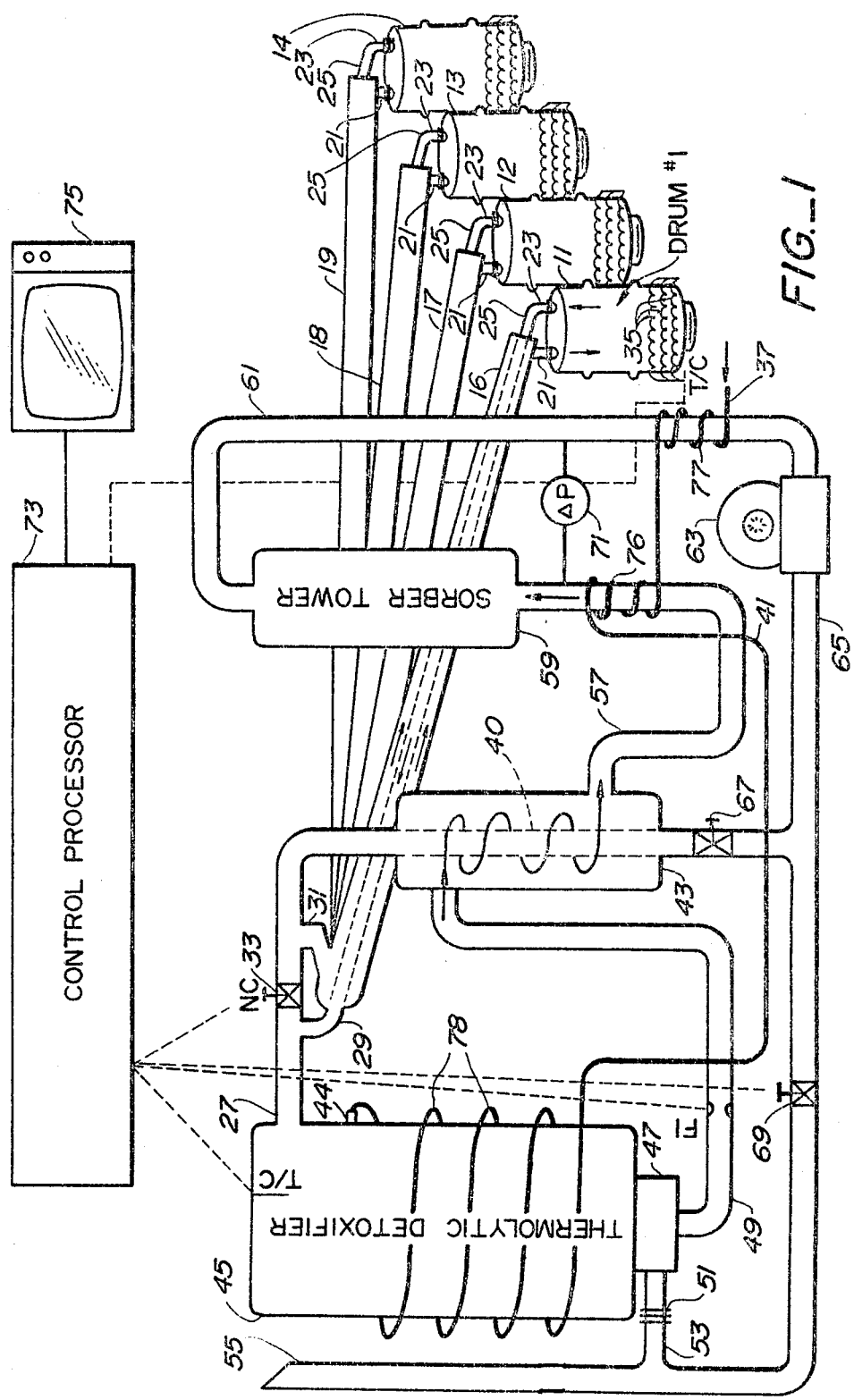
FIG._1

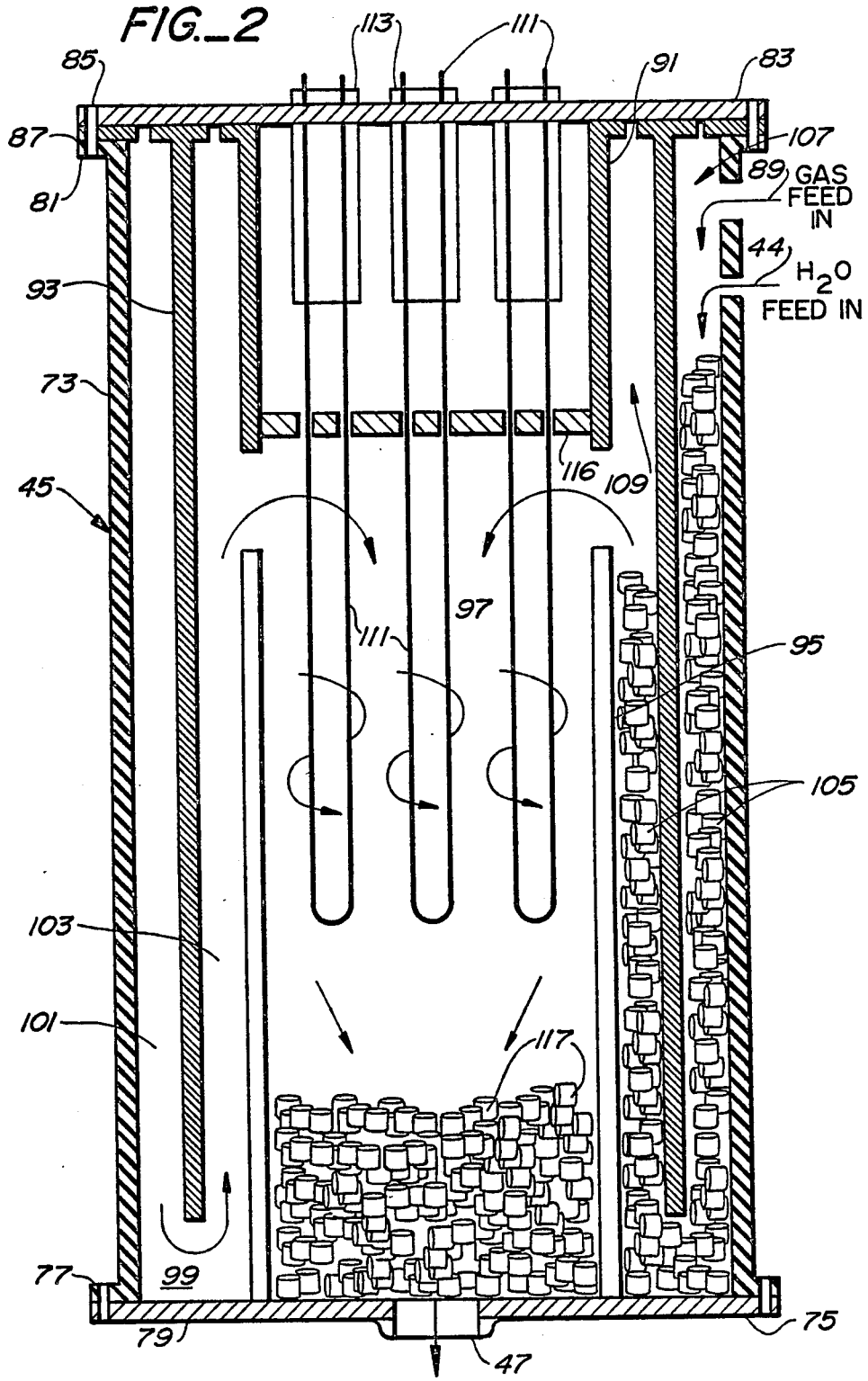

FIG._3
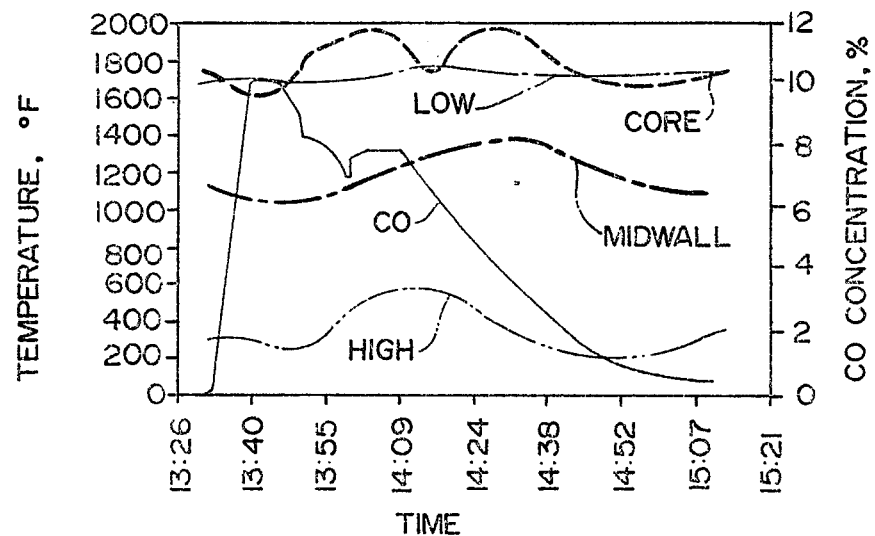
FIG._4
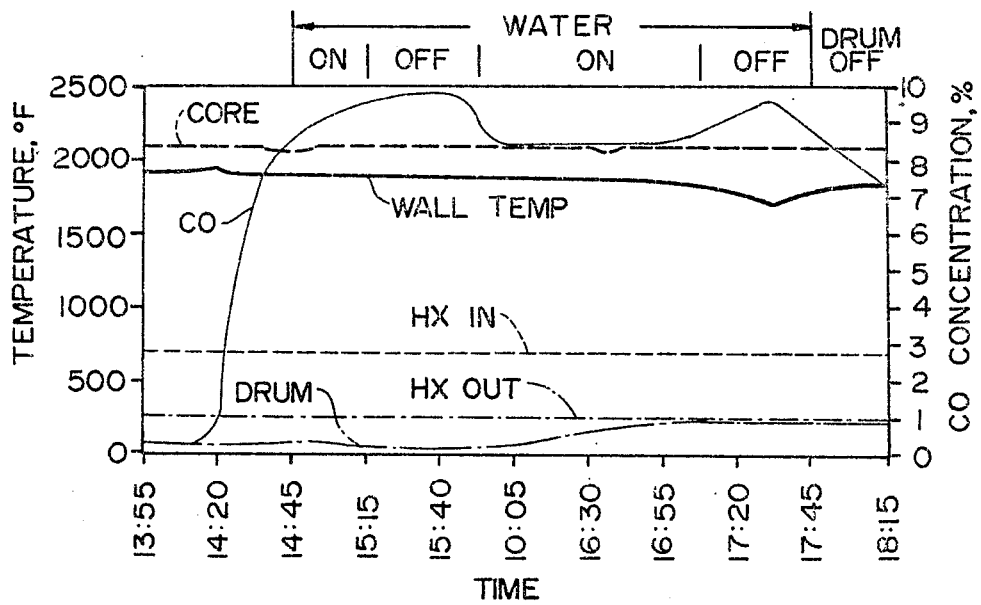

HAZARDOUS WASTE REACTOR SYSTEM

This application is Continuation-in-part of U.S. Application Ser. No. 903,235, filed Sept. 3, 1986 now abandoned.

This invention relates generally to the decomposition of organic compounds, such as toxic waste products. More particularly, the invention relates to an improved method and reactor system for decomposing organic compounds.

Various types of high temperature reactors are employed in the processing of organic compounds, such as toxic waste materials, to convert such materials into compounds which are more acceptable for discharge into the environment or in some cases, re-use. The various processes employed in such reactors include pyrolysis, thermolysis, disassociation, decomposition, and combustion.

Prior art methods and apparatus for decomposing organic compounds have suffered from a number of significant problems with respect to both the processing and the structural aspects of the particular technology employed. For example, many prior art reactor systems provide a relatively short residence time of the reactants within the reaction zone. As a result, it has become necessary in such reactors to employ very high temperatures and/or pressures to completely react the products being processed. High temperatures create many problems with respect to the reactor structural elements, since they may become weakened or reactive at the high temperatures employed. Moreover, the energy requirements in such systems often result in relatively high operating cost.

The need for processing large amounts of organic material has often, in prior art technologies, required the construction of very large reactor systems. The expense and relative unwieldiness of such large scale reactor systems has made them undesirable for many applications.

It is an object of the present invention to provide an improved method and reactor system for decomposing organic compounds.

Another object of the invention is to provide a method and reactor system for decomposing organic compounds wherein a proper combination of temperature, turbulence and residence time in reaction is provided for the compositions being processed.

Another object of the invention is to provide a method and reactor system for decomposing organic compounds which are operable at slightly below atmospheric pressure and at high heating efficiency.

It is a further object of the invention to provide a method and reactor system for decomposing organic compounds that have a high throughput capacity relative to the required size of the reactor system.

A still further object of the invention is to provide an improved method and reactor system for decomposing organic waste which are capable of processing toxic waste materials into harmless compounds under relatively safe and controllable conditions.

Other objects of the invention will become apparent to those skilled in the art from the following description, taken in connection with the accompanying drawings wherein:

FIG. 1 is a schematic diagram of a reactor system incorporating the invention;

FIG. 2 is an enlarged cross-sectional schematic view of the reactor or thermolytic detoxifier portion of the reactor system of FIG. 1; and FIG. 3 is a graph illustrating a typical set of process conditions during the decomposition of one representative class of organic compounds in accordance with the invention.

Very generally, the invention decomposes organic compounds by passing a mixture of the organic compounds and water in a gaseous form into a reactor having at least one reaction zone which has a temperature range between about 750° C and about 1820° C to decompose the organic compounds. The amount of water is controlled to provide an excess of stoichiometry.

Referring now more particularly to the method of the invention, the present invention differs from methods most commonly employed by the prior art in connection with the decomposition of organic compounds. Unlike most prior art techniques, the present invention employs water in excess of stoichiometry in the reaction to cause a disassociation reaction of the organic compound with the water to form carbon dioxide, carbon monoxide and hydrogen. Most prior art reactions are based upon a flame combustion reaction in which the organic compound is mixed with a fuel to be burned, at high temperature, with air (oxygen) to produce carbon dioxide and water. The problem with the latter type of reaction is, in addition to requiring high temperature and high heat removal, the reaction may produce undesirable side reactions and recombinations (products of incomplete combustion or PICS) which could result in the release of toxic compounds into the environment with the effluent.

A benefit of the type of reaction employed in accordance with the method of the invention is that the reaction is endothermic. This provides stability and safety since heat is not released from the reaction and therefore the structural parts of the reactor are maintained at a lower temperature than they would be if the reaction were exothermic, as is the case with the combustion method. If desired, the method of the invention may be run concurrently with some oxidation reaction by adding air and/or oxygen to the input gaseous mixture. By regulating the amount of air introduced, it is possible to run the method as essentially thermally neutral.

In the illustrated embodiment, the gaseous mixture is passed to a first reaction zone into which the gaseous mixture of organic compounds and water is passed is maintained at a temperature range between about 200° C and 1400° C. The low temperature of the range will depend upon the temperature of the gases as they are introduced to the first reaction zone. The high temperature of the range will depend upon the reactor structure itself and the thermal limitations of the structural components. With the first reaction zone comprising an annulus which is, as will be explained below, heated from the interior thereof, the amount of heat radiated and convected from the outer surfaces of the first reaction zone will affect the temperature range of its operation. In the preferred embodiment, the first reaction zone is a folded annulus in which the gases flow first downwardly in the outer part and then upwardly in the coaxial inner part.

In accordance with the invention, the first reaction zone has a labyrinthine path which presents organically adsorbent surfaces to the gaseous mixture flowing through the labyrinthine path. By organically adsorbent surfaces, it is meant surfaces which adsorb the organic gaseous compounds flowing through the first reaction zone, thereby slowing their flow rate and enhancing their kinetics by retaining such compounds in the zone to be fully reacted therein. By employing a labryinthine path, namely, a path that produces a tortuous and highly turbulent flow to the gases passing therethrough, sufficient mixing of the gases and therefore sufficient exposure of the organic compounds therein to the adsorbent surfaces are assured.

In accordance with the present invention, the labryinthine path and the adsorbent surfaces are selected to provide sufficient temperature, turbulent mixing, and residence time in the first reaction zone for substantially all of the gaseous organic compounds to react with the water within the first reaction zone. By substantially all of the organic compounds, it is meant in excess of 99% and preferably in excess of 99.99% reacted. Preferably, to ensure proper turbulence and surface area, the void volume in the first reaction zone is selected to be between about 30% and about 90% of the total volume of the first reaction zone. Preferably, the void volume is about 75% of the total volume. As will be explained below, the void volume and tortuous path are provided by selecting particulate material having a shape suitable to provide the above-stated characteristics.

In order to assure that the products in the first reaction zone are substantially all reacted, the amount of water added to the gaseous mixture is equal to or in excess of stoichiometry. By this terminology, it is meant that mole for mole, the amount of water is greater than is necessary to combine with 100% of the organic compounds present in the gaseous mixture. The preferred range is between 100% and 200% of stoichiometry, since anything greater than 200% has a tendency to reduce the operating temperatures undesirably. The optimal percentage has been found to be about 131% of stoichiometry, namely, 31% in excess of stoichiometry. These levels of water assure the desired substantial reaction of the organic compounds and $CO_2$ formation in the first reaction zone, while maintaining optimal temperatures.

After reaction in the first reaction zone, the effluent from the first reaction zone is passed to a second reaction zone for further reaction. The temperature of the second reaction zone is at a higher temperature than that of the first, having a temperature range between about 750° C and about 1820° C. In the second reaction zone, the remaining organic compounds are decomposed to carbon dioxide, carbon monoxide and hydrogen. If any oxygen is added to the gas mixture, the reaction products will also include water. As was the case in the first reaction zone, the amount of water in the second reaction zone is controlled so that it is equal to or in excess of stoichiometry in the second reaction zone. The higher temperature of the second reaction zone, together with the relatively low level of organic compounds entering the second reaction zone, assure that total and complete reaction of the organic compounds results to a level of at least 99.99% and typically much higher.

To further assure complete reaction, the residence time of the gases in the second reaction zone is made about equal to the residence time in the first reaction zone. To do this, the flow cross-section of the second reaction zone may be made substantially larger than that of the first reaction zone to thereby increase the residence time of the flowing gases. Preferably, the flow cross-section of the second reaction zone is about twice that of the first.

In accordance with the invention, heat is introduced to the reactor directly to the second reaction zone. The first reaction zone is an annulus which is positioned adjacent the second reaction zone coaxially thereof and surrounding same. As a consequence, the heat in the second reaction zone is radiated and conducted to the first reaction zone to provide heating thereof.

The flow rate of the gaseous mixture introduced to the first reaction zone is, preferably, between about two kilograms per minute and about eight kilograms per minute. The precise flow rate of the organic compound versus the water and/or oxygen will, of course, be determined by the stoichiometry of the chemistry involved. The flow rate of the gaseous mixture introduced to the first reaction zone is, preferably, between about 19 cubic meters per minute and about 3.5 cubic meters per minute, depending upon the particular compound being decomposed. Typically, for a given temperature, the larger the molecule, the longer the reaction time and the higher the temperature needed to effect the desired reaction.

Referring now to FIG. 1, a typical configuration of a reactor system incorporating the invention is shown. In the system of FIG. 1, a plurality of metal drums 11, 12, 13 and 14 are shown connected to the system. It is to be understood, however, that the system of the invention and the method of the invention may be utilized in connection with a single drum or other container or source of organic materials to be decomposed, or a plurality of such sources. As shown in FIG. 1, each drum is connected via a bidirectional flow coaxial conduit 16, 17, 18, and 19, respectively to the thermolytic detoxifier described in detail below. Each conduit has a central duct and an outer duct of annular cross section extending coaxially and coextensively with the central duct. Flow into the respective drums is provided through connectors 21 whereas outflow from the drums is provided through connectors 23. Outflow from the drums is carried through the coaxial conduits 16–19 in the inner duct of the conduit, whereas flow of hot steam and gases into the drums is through the outer annular cross-section duct of the conduit. An extension 25 is provided to couple the outer duct of the coaxial conduits 16, 17, 18, and 19 to the connectors 21. The inner ducts couple to the connectors 23.

The opposite ends of the conduits 16–19 from the drums 11–14 have their central ducts all connected to an inlet conduit 27 via an extension 29. A duct 31 is connected to the outer duct of each of the coaxial conduits 16–19 for reasons explained below. A normally closed valve 33 separates the inlet conduit 27 from the duct 31.

In order to volatilize the contents of the drums 11–14, the drums are heated by any suitable means. In the illustrated embodiment, a resistive heater having a plurality of coils 35 is shown surrounding the drum 11. The heater 35, together with the hot gases flowing back to the drum, raises the temperature of the drum contents to the desired level. Similar heaters, not shown, may be provided for the other drums. Volatilization of the contents of the drums, together with the action of a turbine blower, described below, causes passage of the volatilized contents through the central duct of the conduits 16–19 through the extension 29 to the inlet conduit 27.

Water is mixed with the volatilized contents of the drums 11–14 by steam in the gas flow to and from the drums. The steam is present as a result of water addition to the reactor detoxifier 45, explained below. The steam thus formed passes back through the outer annulus in each of the conduits 16–19, depending upon the drum being operated, to pass into the drum in the space above the organic material therein. In this space, the steam is mixed with the volatilized organic material and passes up through the central duct of the coaxial conduit 16, through the extension 29 and the conduit 27 and into the reactor or thermolytic detoxifier 45. By using the illustrated coaxial conduit arrangement, the walls of the central duct, carrying the volatilized organic compound from the drum, are kept hot enough to prevent condensation, carbonization, precipitation, and crystallization, which could plug the duct.

The internal structure of the thermolytic detoxifier 45 is discussed in detail below. The effluent from the thermolytic detoxifier 45 passes through an outlet assembly 47 into a conduit 49. A safety burst disk 51, designed to rupture upon the pressure of the conduit 49 exceeding a predetermined safety level, is interposed in a duct 53 communicating between the outlet 47 and a vent tube 55. The duct 49 communicates from the outlet 47 of the thermolytic detoxifier 45 to the gas-to-gas heat exchanger 43. The outlet assembly 47 can include an internal cyclone separator (not shown) to remove any fine dust carried out of thermolytic detoxifier 45.

The gas-to-gas heat exchanger 43 may be of any suitable design which serves to exchange heat from gas flowing out of the thermolytic detoxifier 45 to gas flowing into the conduit 40. After exchanging heat with such gas, the effluent passing from the conduit 49 through the gas-to-gas heat exchanger 43 enters a conduit 57 which leads to a sorber tower 59 of suitable construction. The sorber tower 59 contains a suitable sorbent material for adsorbing any remaining impurities flowing through the conduit 57.

A conduit 61 returns the effluent from the sorber tower 59 to a turbine blower 63 which provides the main motive force for producing flow in the illustrated system. The outlet of the turbine blower 63 passes through a conduit 65 and through a control valve 67 into the gas-to-gas heat exchanger 43 where it is heated by the gas from the conduit 49. A normally closed valve 69 provides for venting the output of the sorber tower 59 through the turbine blower 63 via the vent 55. A pressure gauge 71 is connected to monitor the pressure across the sorber tower 59.

In order to introduce the necessary amount of water to the reactor, a water conduit 41 is provided connecting a pressurized source 37 of water to a steam inlet port 44 on the thermolytic detoxifier 45. Water flowing through the conduit 41 is heated to form steam in the coiled regions 76 and 77 of the conduit 41. These coiled regions are formed around the conduits 57 and 61 through which the hot effluent from the thermolytic detoxifier 45 flows. Further capture of heat for the water flowing through the conduit 41 is accomplished by a plurality of coils 78 which are wrapped around the outer surface of the thermolytic detoxifier 45. Thus, by the time the water enters the thermolytic detoxifier 45 via the port 44, it is heated to the form of superheated steam and mingled with the gases entering the thermolytic detoxifier via the inlet conduit 27.

Control over the process is provided by a suitable control processor 73. Control processors utilizing various types of computers are well known in the art and therefore the control processor 73 will not be further described in detail. The operation of the control processor 73 is controlled from a suitable computer monitor 75 and touchscreen.

In operating the system illustrated in FIG. 1, each of the drums 11–14 is connected, one at a time, through the respective conduits 16–19 to the system. Each drum may be associated with a suitable identification code reading system, and a suitable interlock, not shown, may be used to assure that the drum may not be connected to the system until its contents are properly inputted to the control processor 73 and approved for processing.

Referring now to FIG. 2, the specific internal details of the reactor or thermolytic detoxifier 45 may be seen in cross-section. The thermolytic detoxifier 45 comprises an outer cylindrical wall 73 of a material having sufficient structural strength at the relatively high operating temperatures described above to maintain the integrity of the reactor. Preferably, the material is type 316-L stainless steel tubing having a thickness of four to eight millimeters wherein the longitudinal or axial dimension of the thermolytic detoxifier is about 1.8 meters and the inner diameter of the wall is about 43 centimeters. The lower end of the decomposer or reactor is closed by a circular plate 75 which is secured to the cylindrical wall 73 by means of a flange 77 extending from the wall radially outward thereof and by suitable mounting bolts 79. A flange 81 similar to the flange 77 is provided at the upper end of the cylindrical wall 77 and a circular plate 83 is bolted thereto by means of bolts 85. Sandwiched in between the plate 83 and the flange 81 and secured by the bolts 85 is a mounting ring 87. The conduit 27 (FIG. 1) connects with the interior of the thermolytic detoxifier 45 through a port 89 located near the upper end of the cylindrical wall 73.

Extending from the ring 87 and preferably integral therewith is a cylindrical wall 91. This wall is coaxial with the wall 73 and extends downwardly from the ring 87 about 20% of the length of the cylindrical wall 73. Interposed between the cylindrical wall 91 and the cylindrical wall 73 and coaxial therewith is a cylindrical wall 93. The cylindrical wall 93 extends downwardly within the cylindrical wall 73 and terminates a distance above the plate 75 which is between about 5% and 10% of the total axial length of the cylindrical wall 73. Preferably, the material of the ring 87, the plates 75 and 83, the cylindrical wall 91, and the cylindrical wall 93 is the same as that of the cylindrical wall 73, namely, 316-L stainless steel tubing. For a 1.8 meter length thermolytic detoxifier, the thickness of these latter elements is preferably approximately four to eight millimeters for inner diameters of about 24 centimeters for the wall 91 and 33.9 centimeters for the wall 93.

Supported on the plate 75 and extending upwardly therefrom is a cylindrical wall 95. The cylindrical wall 95 is substantially equal in diameter to the cylindrical wall 91 and is axially aligned therewith. The cylindrical wall 95 is of a length to terminate a distance below the termination of the cylindrical wall 91 so as to leave a space therebetween of a height between about 5% and about 10% of the total length of the cylindrical wall 73. Preferably, the material of which the cylindrical wall 95 is comprised is a ceramic material such as alumina or a mix of alumina and titanium oxide. Mullite (TM) tubing having a wall thickness of approximately one centimeter is a satisfactory material for the cylindrical wall 95 in a reactor of about 1.8 meters length and an inner diameter of the wall 93 of about 33.9 centimeters. Other suitable ceramic materials for the tubing include Vycor (TM) and Pyroceram (TM).

The result of the foregoing described arrangement is a central reaction chamber 97 which is surrounded by a coaxial reaction chamber 99, the latter being separated into two subchambers, an outer subchamber 101 and an inner subchamber 103. Gas entering the reactor through the port 89 may pass downwardly through the outer annulus 101, through the gap between the plate 75 and the lower end of the cylinder 93, upwardly through the inner annulus 103, through the gap between the upper end of the cylindrical wall 95 and the lower end of the cylindrical wall 91, and downwardly through the central reaction chamber 97 to exit through the port 47 in the plate 75.

The annular or outer coaxial reaction chamber 99 comprised of the subchambers 101 and 103 is substantially filled with particulate ceramic material indicated at 105. The material is selected to be of a size and configuration to provide a labryinthine path for gas flowing through the outer annulus 101 and inner annulus 103. In addition, the configuration and size of the material is selected to provide the desired void volume in the space occupied by the material. The material is present in an amount sufficient to extend up to the orifice 89, thus leaving an empty annular plenum 107 at the top of the outer annulus 101 to evenly distribute the flow. Similarly, the amount of material placed in the inner annulus 103 extends to just below the upper edge of the cylindrical wall 95 to leave a plenum 109 at the upper end of the inner annulus 103 the purpose of which is to maintain a cool top flange plate and electrical feedthrough. The ceramic material utilized preferably is in the form of $\frac{1}{2}$ inch diameter rashig rings. Also acceptable are spherical or other shaped particles of aluminum oxide. The materials thereby provide turbulence as well as a large hot surface area exposed to the gas flow to enhance the chemical kinetics and to adsorb and thereby increase the residence time of the hydrocarbons in the reaction chamber. This provides the desired kinetics and retention time to effect the reactions described above.

The thermolytic detoxifier 45 is heated by a plurality of elongated U-shaped hairpin shaped loops of electrical resistance heating elements 111. The heating elements 111 extend downwardly within the reaction chamber 97 a distance at least equal to half the length of the reaction chamber. The heaters are mounted in the plate 83 by a ceramic mounting fixture 113. The fixture 113 may be any suitable heat resistant insulation material, for example, quartz, alumina, molybdenum disilicide, lanthanum chromite, and lanthanum diboride. Power for the electrical heaters 111 is provided through electrical feedthroughs 115 mounted to the upper surface of the plate 83. A radiation shield 116 is also provided just below the fixture 113. Above the heating elements there may be a metal cap (not shown) to provide a good process seal and help reduce further heat loss.

At the bottom of the reaction chamber 97, a volume of particulate material or ceramic structure 117, which can be similar to or identical to the particulate material 105, is provided. The amount of the ceramic material occupies about 5% to 15% of the length of the reaction chamber 97, remaining out of contact with the heating elements 117. The hot gases passing out of the reaction chamber 97 through the vent 47 heat the ceramic material 117. This retained heat is transferred to the ceramic material at the lower end of the annulus 99 for greater heating efficiency thus serving both as a heat recuperator and controlled gas quenching system. The heat within the chamber 97 also heats the cylinder 95 and is radiated and thermally conducted into the ceramic particulate material in the annular reaction zone 99. The flow cross-section of the central reaction chamber is about double that of the annulus 101 and of the annulus 103 to provide the desired residence time.

In operation of the thermolytic detoxifier 45, the mixture of gaseous organic compounds and steam (and possibly oxygen) is fed into the reactor through the port 89 and passes downwardly over the material in the outer annulus 101 and back upwardly through the material in the annulus 103. In this region, the hydrocarbons are retained on the hot adsorbent surfaces of the particulate material for a time sufficient to produce the above-described reaction. In addition, the configuration of the particulate material provides sufficient turbulence for adequate mixing and to assure that the organic compounds are brought into contact with the surfaces and with the steam to effect the reaction. The decomposition of the organic compounds is at least about 99% by the time the gas enters the central reactor 97 through the gap between the cylindrical wall 91 and the cylindrical wall 95. In the reactor chamber 97, the gases encounter their highest temperature which then assures complete (at least 99.99%) reaction of the organic compounds, producing the final relatively harmless effluent. The effluent is then passed out of the port 47 for processing as described above.

Referring now to FIG. 3, a graph depicting temperature variation within the reactor is shown. In addition, the amount of carbon monoxide measured in the source drum is also shown. All parameters measured are graphed with respect to time and for an organic waste consisting of substantially all cyclohexanone.

It may be seen that the temperature in the core or chamber 97 varies from a low of just below 1600° F (785° C) to a high of about 1850° F (1010° C). Temperatures of the outer wall are shown as measured in three different places, a high location at about the level of the gap between the wall 95 and the wall 109, a low level near the lower end of the wall 93, and a mid level approximately half-way between the foregoing two points. Finally, it may be seen that the level of carbon monoxide substantially increases just after beginning operation as the contents of the drum volatilize due to heating. The carbon monoxide level gradually drops, finally reaching zero after just over 2½ hours of processing. By sensing the zero level of carbon monoxide, the completion of the processing of the contents of the drum may be determined.

The addition of excess water substantially lowers the levels of carbon monoxide and makes environmental control of vent gases easier. FIG. 4 shows that excess water has a prompt effect on reducing carbon monoxide. The right hand scale represents carbon monoxide percentage whereas the other lines relate to the left hand scale of temperature.

The following examples are set out to further illustrate the operation of the invention. They are not intended to limit the scope of the invention which is solely defined by the claims set out below.

EXAMPLE I

For a mixture of equal parts $C_8H_{10}$ and $CH_3OH$ (Xylene and Methanol) processed at a rate of five 55 gallon drums per day, using water addition at 131% of stoichiometry, produces greater than 99.99% conversion to carbon dioxide, carbon monoxide, and hydrogen under the following mass flow conditions (in kilograms per minute):

| Stream | Solvent | H$_2$O | CO | CO$_2$ | H$_2$ | NM$^3$/M | °C. | Pressure (KPA) |
|---|---|---|---|---|---|---|---|---|
| Drum Evap. | 0.57 | 0 | 0 | 0 | 0 | 0.18 | 107 | −6.5 |
| Recycle | .00 | 0.40 | 0.05 | 1.21 | 0.10 | 2.12 | 871 | −6.5 |
| Decomposer In | 0.57 | 1.26 | 0.10 | 1.13 | 0.14 | 3.95 | 843 | −9.4 |
| Decomposer Out | .00 | 0.25 | 0.61 | 1.95 | 0.19 | 5.14 | 545 | −16.2 |
| Turbine Out | .00 | 0.25 | 0.61 | 1.95 | 0.19 | 5.14 | 115 | +8.1 |
| Heat Exch. Out | .00 | 0.91 | 0.12 | 2.72 | 0.22 | 5.14 | 315 | |
| Vent | .00 | 0.50 | 0.12 | 1.51 | 0.12 | 3.04 | 115 | +0.5 |
| Water In | .00 | 1.26 | 0 | 0 | 0 | 1.58 | 91 | −6.5 |
| Drum In | .00 | 1.26 | 1.13 | 1.13 | 0.14 | 3.40 | 298 | −8.1. |

EXAMPLE II

For a mixture of equal parts CH$_3$OH and Cl$_3$C-CH$_3$, and a rate set at five/drums/day, the following mass flow conditions in pounds per minute were determined. A stoichiometric amount of water was used. The result was in excess of 99.99% conversion to carbon dioxide, hydrogen and hydrogen chloride.

| Stream | Solvent | H$_2$O | CO$_2$ | H$_2$ | HCL | NM$^3$/M | % Vol HCL |
|---|---|---|---|---|---|---|---|
| Drum Evap. | 0.57 | 0 | 0 | 0 | 0 | 1.24 | 0 |
| Recycle | .00 | 0 | 1.78 | 0.20 | 1.48 | 4.1 | 27.4 |
| Decomposer In | 0.57 | 0.31 | 1.78 | 0.20 | 1.48 | 4.57 | 26.8 |
| Decomposer Out | .00 | 0 | 2.28 | 0.25 | 1.85 | 5.15 | 27.5 |
| Turbine Out | .00 | 0 | 2.28 | 0.29 | 1.85 | 5.15 | 27.5 |
| Vent | .00 | 0 | 0.46 | 0.05 | 0.37 | 1.03 | 27.6 |
| Water In | .00 | 0.31 | 0 | 0 | 0 | 0.39 | 0 |
| Drum In | .00 | 0.31 | 1.78 | 0.20 | 1.48 | 4.49 | 25.6. |

EXAMPLE III

For equal parts methanol and xylene, and a rate set at five drums/day, the following conditions were observed to produce 99.99% conversion to carbon dioxide and hydrogen. A stoichiometric amount of water was used.

| Stream | Solvent | H$_2$O | CO | CO$_2$ | H$_2$ | NM$^3$/M | °C. | Pressure (in. H$_2$O) |
|---|---|---|---|---|---|---|---|---|
| Drum Evap. | 0.57 | 0 | 0 | 0 | 0 | 0.18 | 107 | −6.5 |
| Recycle | 0 | 0 | 1.13 | 0.22 | 0.08 | 2.84 | 871 | −6.5 |
| Decomposer In | 0.57 | 0.66 | 1.13 | 0.22 | 0.08 | 3.89 | 288 | −9.4 |
| Decomposer Out | 0 | 0 | 2.04 | 0.40 | 0.15 | 5.14 | 1315 | −16.2 |
| Turbine Out | 0 | 0 | 2.04 | 0.40 | 0.15 | 5.14 | 60 | +8.1 |
| Vent | 0 | 0 | 0.91 | 0.18 | 0.06 | 2.30 | 115 | +0.5 |
| Water In | 0 | 0.66 | 0 | 0 | 0 | 0.85 | 91 | −6.5 |
| Drum In | 0 | 0.66 | 1.13 | 0.22 | 0.08 | 3.67 | 298 | −8.1 |

It may be seen, therefore, that the invention provides an improved method and apparatus for decomposing organic compounds. The organic compounds are converted into carbon dioxide, carbon monoxide, water, and hydrogen with better than 99.99% destruction levels. High heating efficiency is attained with high throughput in a relatively small size reactor. Free radical chemistry side reactions in flame combustion reactions which may produce carcinogens in vent gases are eliminated. The system operates at essentially atmospheric pressure with no expensive high maintenance compressors or heavy walled high pressure vessels. Waste handling parts of equipment are operated below atmospheric in order to prevent waste leakage outward in case of piping or equipment leakage. The vent gas can be used as a synthetic fuel gas to achieve power recovery in small gas engines or turbines, as a feedstock for chemical manufacture, or as a boiler or furnace fuel.

Various modifications of the invention in addition to those shown and described herein will become apparent to those skilled in the art from the foregoing description. Such modifications are intended to fall within the scope of the appended claims.

What is claimed is:

1. A method for noncombustively decomposing organic compounds, comprising passing a gaseous mixture of the organic compounds and water into a reactor which includes a reaction zone having a temperature range between about 200° C and 1820° C to noncombustively decompose the organic compounds in the gaseous mixture, maintaining the ratio of water to organic compounds present in said gaseous mixture in said reaction zone such that the amount of water is greater than the stoichiometric amount necessary to combine with 100% of the organic compounds present in the gaseous mixture, and maintaining a residence time and mixing of said gaseous mixture and said water in said reaction zone to react substantially all of said organic compounds with said water to produce carbon monoxide and hydrogen as reaction product.

2. A method according to claim 1 wherein the amount of water in said gaseous mixture is about 131% of stoichiometry.

3. A method according to claim 1 wherein the organic compound is a liquid, and wherein the liquid organic compound is first volatilized before passing it into said reaction zone.

4. A method according to claim 1 wherein oxygen is introduced to said reaction zone in an amount sufficient to maintain the reactions therein substantially thermally neutral but in an amount insufficient to support self-sustaining combustion in said reaction zone.

5. A method according to claim 1 wherein said reaction zone comprises, a first reaction zone having a temperature range between about 200° C and 1400° C, said first reaction zone having a labyrinthine path presenting organically adsorbant surfaces to the gaseous mixture to provide a residence time in said first reaction zone sufficient to react substantially all of said gaseous organic compounds with said water, and wherein effluent from said first reaction zone is passed to a second reaction zone having a temperature range between about 750° and 1820° C.

6. A method according to claim 5 wherein said second reaction zone is maintained at a higher temperature than said first reaction zone.

7. A method according to claim 5 wherein said first reaction zone is maintained within at least two different temperature ranges including a first sub-zone having a temperature range between about 150° C and about 1100° C, and a second sub-zone having a temperature range between about 1000° C and about 1700° C, said second sub-zone being hotter than said first sub-zone.

8. A method according to claim 5 wherein said first reaction zone has a void volume between about 30% and about 90% of the total volume of said zone.

9. A method according to claim 5 wherein said first volume zone has a void volume about 75% of the total volume.

10. A method according to claim 5 wherein the gaseous mixture is introduced to the first reaction zone at a rate of between about two kilograms per minute and about eight kilograms per minute.

11. A method according to claim 5 wherein the flow rate of the gaseous mixture introduced to the first reaction zone is between about 3.5 cubic meters per minute and about 19 cubic meters per minute.

* * * * *